United States Patent
Harris

(10) Patent No.: US 11,705,637 B2
(45) Date of Patent: Jul. 18, 2023

(54) MAGNETODIELECTRIC METAMATERIALS AND ARTICLES INCLUDING MAGNETODIELECTRIC METAMATERIALS

(71) Applicant: Northeastern University, Boston, MA (US)

(72) Inventor: Vincent Harris, Sharon, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 16/600,292

(22) Filed: Oct. 11, 2019

(65) Prior Publication Data

US 2020/0119451 A1 Apr. 16, 2020

Related U.S. Application Data

(60) Provisional application No. 62/744,302, filed on Oct. 11, 2018.

(51) Int. Cl.
  *H01Q 15/00* (2006.01)
  *H01Q 9/04* (2006.01)
  *C01G 49/00* (2006.01)

(52) U.S. Cl.
  CPC ..... *H01Q 15/0086* (2013.01); *C01G 49/0036* (2013.01); *C01G 49/0054* (2013.01); *C01G 49/0072* (2013.01); *H01Q 9/0485* (2013.01); *H01Q 9/0407* (2013.01)

(58) Field of Classification Search
  CPC .............................. H01Q 15/0086; H01Q 1/42
  See application file for complete search history.

(56) References Cited

U.S. PATENT DOCUMENTS

| | | | | |
|---|---|---|---|---|
| 9,425,513 | B2 * | 8/2016 | Oh ..................... | H01Q 15/0026 |
| 2004/0140945 | A1 * | 7/2004 | Werner .............. | H01Q 15/0086 343/909 |
| 2004/0227687 | A1 * | 11/2004 | Delgado ............ | H01Q 15/0086 343/872 |
| 2006/0092079 | A1 * | 5/2006 | de Rochemont .... | H01Q 15/006 343/700 MS |
| 2012/0154234 | A1 * | 6/2012 | Geiler ................. | H01Q 15/008 343/795 |

(Continued)

OTHER PUBLICATIONS

Z. Zheng et al., "Low-loss Z-type barium hexaferrite composites from nanoscale ZnAl2O4 addition for high-frequency applications", AIP Advances 8, 056107 (2018) doi.org/10.1063/1.5006780.

(Continued)

*Primary Examiner* — Hasan Islam
(74) *Attorney, Agent, or Firm* — Verrill Dana, LLP

(57) ABSTRACT

Magnetodielectric (MD) metamaterials have a magnetodielectric (MD) substrate of a ferrite composition or composite having a characteristic impedance matching an impedance of free space and at least one frequency selective surface (FSS). The FSS has a plurality of frequency selective surface elements disposed in a pattern and supported on the MD substrate. The FSS has a conducting composition and is configured to permit one or more of transmission, reflection, or absorption at a selected resonant frequency or selected frequency band. Articles incorporating magnetodielectric metamaterials are provided.

16 Claims, 7 Drawing Sheets

(56) References Cited

U.S. PATENT DOCUMENTS

| | | | |
|---|---|---|---|
| 2012/0169554 A1* | 7/2012 | Behdad | H01Q 9/40 |
| | | | 343/742 |
| 2017/0033468 A1* | 2/2017 | Wong | H01Q 15/0086 |
| 2017/0093045 A1* | 3/2017 | Savage | H01Q 15/0086 |
| 2017/0213628 A1 | 7/2017 | Chen et al. | |
| 2018/0016157 A1 | 1/2018 | Chen et al. | |
| 2019/0139687 A1 | 5/2019 | Chen et al. | |

OTHER PUBLICATIONS

Y. Chen et al., "Electronic tuning of magnetic permeability in Co2Z hexaferrite toward high frequency electromagnetic device miniaturization", Appl. Phys. Lett. 98, 202502 (2011) doi.org/10.1063/1.3590771.

Z. Su et al., "Tunable permittivity and permeability of low loss Z + Y-type ferrite composites for ultra-high frequency applications", Journal of Applied Physics 117, 17E506 (2015) doi.org/10.1063/1.4916557.

A. P. Daigle et al., "Numeric Simulations of a Novel Wideband Electromagnetic Band Gap Metamaterial Utilizing Oriented Cobalt-Susbituted Z-Type Barium Hexaferrites", IEEE Magnetics Letters, vol. 2, (2011). 4 pages.

Z. Su et al., "Low loss factor Co2Z ferrite composites with equivalent permittivity and permeability for ultra-high frequency applications," Appl. Phys. Lett., 105, 062402 (2014); doi: 10.1063/1.4892889.

Y. Peng et al., "BiFeO3 tailored low loss M-type hexaferrite composites having equivalent permeability and permittivity for very high frequency applications", Journal of Alloys and Compounds, 630, 48-53 (2015).

X. Wang et al., "Enhanced microwave absorption of multiferroic Co 2 Z hexaferrite-BaTiO 3 composites with tunable impedance matching", Journal of Alloys and Compounds, 643, 111-115, 2015.

Zheng et al., "Low-loss NiZnCo ferrite processed at low sintering temperature with matching permeability and permittivity for miniaturization of VHF-UHF antennas" Journal of Applied Physics, 121, 6, 63901, 2017.

Xie et al., "Co-substituted LiZnTiBi ferrite with equivalent permeability and permittivity for high-frequency miniaturized antenna application", Ceramics International, vol. 45, (2019), pp. 17915-17919.

Souriou et al., "Influential parameters on electromagnetic properties of nickel-zinc ferrites for antenna miniaturization", Journal of Applied Physics, 107, 09A518 (2010), 4 pages.

Zheng et al., "Low loss and tailored high-frequency performances of BaO-doped NiZnCo magneto-dielectric ferrites", Journal of the American Ceramic Society. Feb. 2020;103:pp. 1248-1257.

Zheng et al., "Low loss NiZn spinel ferrite-W-type hexaferrite composites from BaM addition for antenna applications", Journal of Physics D: Applied Physics, 47(2014) 115001, 7 pages.

Gan et al., "Low loss, enhanced magneto-dielectric properties of Bi2O3 doped Mg—Cd ferrites for high frequency antennas", Journal of Alloys and Compounds, 735 (2018) pp. 2634-2639.

Su et al., "Low-loss NiCuZn ferrite with matching permeability and permittivity by two-step sintering process", Journal of Applied Physics 113, 17B301 (2013), 4 pages.

Thakur et al., "Low-loss spinel nanoferrite with matching permeability and permittivity in the ultrahigh frequency range", Journal of Applied Physics, 108, 014301 (2010), 5 pages.

Kulik et al., "Broadband free space impedance in Co2Z hexaferrites by substitution of high valency heavy transition metal ions for miniaturized RF devices", Applied Physics Letters 116, 202404 (2020), 6 pages.

Li et al., "Co2Z hexaferrites with equivalent permeability and permittivity in UHF band", J. Mater Sci: Mater Electron (2022) 33:pp. 8226-8232.

Xia et al., "Investigation of low loss Z-type hexaferrites for antenna applications", Journal of Applied Physics, 111, 063921 (2012), 5 pages.

Xia et al., "Miniaturized terrestrial digital media broadcasting antenna based on low loss magneto-dielectric materials for mobile handset applications", Journal of Applied Physics, 112, 43915 (2012), 5 pages.

Vinaykumar et al., "Synthesis and characterization of Ba2Co2Fe12O22—NiFe2O4 ferrite composites: a useful substrate material in miniaturizing antenna", J Mater Sci: Mater Electron (2021) 32: pp. 7330-7339.

\* cited by examiner

MAGNETODIELECTRIC METAMATERIALS AND ARTICLES INCLUDING MAGNETODIELECTRIC METAMATERIALS

CROSS REFERENCE TO RELATED APPLICATIONS

This application claims priority under 35 U.S.C. § 119(e) of U.S. Provisional Application No. 62/744,302, filed on Oct. 11, 2018, entitled "Impedance Engineered Magnetoceramic Metamaterials," the disclosure of which is hereby incorporated by reference.

STATEMENT REGARDING FEDERALLY SPONSORED RESEARCH OR DEVELOPMENT

N/A

BACKGROUND

A significant challenge to national defense and commercial sectors is the need for superior structural and electromagnetic functionality for radomes and other structures offering protection to antenna systems. The ideal radome structure would offer a defense against extreme electronic warfare (EW) threats and mitigate co-site interference in addition to protection against environmental and extreme weather conditions. Although such descriptions can be readily attributed to the needs of the military, commercial industries suffer from analogous co-site interference challenges stemming from multiple transmit and receive antenna sharing a common tower. Furthermore, EW threats can be aimed at national grids and therefore such mitigation strategies are needed for both defense and commercials communities.

SUMMARY

The present technology provides a new class of magnetodielectric (MD) metamaterials for use as smart materials and coatings that provide impedance (Z) of free space (i.e., unity) together with concomitant minimal broadband reflection losses (RL) and insertion losses (IL). In combination with a frequency selective surface, the MD metamaterials can provide strategic filtering functions and out-of-band rejection. Together, these properties can mitigate extreme EW threats as well as co-site interference situations arising from co-location of multiple radar and communication systems on common land, sea, and air platforms.

The present technology includes the following embodiments, aspects, and features:

1. A magnetodielectric (MD) metamaterial comprising:
   a magnetodielectric (MD) substrate comprising a ferrite composition or composite having a characteristic impedance matching an impedance of free space within 5%; and
   at least one frequency selective surface (FSS) having a plurality of frequency selective surface elements disposed in a pattern and supported on the MD substrate, the FSS comprising a conducting composition, and configured to permit one or more of transmission, reflection, or absorption at a selected resonant frequency or selected frequency band.
2. The MD metamaterial of item 1, wherein a real permittivity of the ferrite composition or composite is equal to a real permittivity of the ferrite composition or composite within 10%.
3. The MD metamaterial of any of items 1-2, wherein the frequency selective surface element is selected from the group consisting of loop type, center-connected type, N-pole type, solid interior type, and plate type, and combinations thereof.
4. The MD metamaterial of any of items 1-3, wherein the ferrite composition or composite comprises a hexaferrite composition selected from the group consisting of a Z-type phase hexaferrite, a Y-type phase hexaferrite, an M-type phase hexaferrite, a W-type hexaferrite, an X-type hexaferrite, and a U-type hexaferrite, and combinations thereof.
5. The MD metamaterial of any of items 1-4, wherein the ferrite composition or composite comprises a spinel ferrite of stoichiometry $(TM)Fe_2O_4$, where TM is a transition metal selected from the group consisting of iron, cobalt, manganese, nickel, zinc, copper, magnesium, chromium, and titanium of valence +1, +2, +3, or +4, and combinations thereof.
6. The MD metamaterial of any of items 1-5, wherein the ferrite composition or composite comprises a hexaferrite composition comprising a Z-type hexaferrite phase, a Y-type hexaferrite phase, or both a Z-type hexaferrite phase and a Y-type hexaferrite phase.
7. The MD metamaterial of any of items 1-6, wherein the ferrite composition or composite comprises a hexaferrite composition comprising an oxide structure having iron, cobalt, zinc, nickel, chromium, manganese, magnesium, and/or titanium and one or more of barium, strontium, iridium, hafnium, and molybdenum having a composition comprising $Ba_3Co_{2+X}Fe_{24-2X}O_{41}$, where x=0.05 to 0.20 of quadrivalent iridium, hafnium, and molybdenum.
8. The MD metamaterial of any of items 1-7, wherein the ferrite composition or composite comprises $Ba(CoTi)_{1.2}Fe_{9.6}O_{19}$ and an amount of $Bi_2O_3$, the amount $Bi_2O_3$ ranging between 0 and 10 wt %.
9. The MD metamaterial of any of items 1-8, wherein the ferrite composition or composite comprises a hexaferrite composition comprising Co2Z and Co2Y ferrite particles, having nominal compositions $Ba_3Co_2Fe_{24}O_{41}$ and $Ba_2Co_2Fe_{12}O_{22}$, respectively.
10. The MD metamaterial of any of items 1-9, wherein the ferrite composition or composite comprises a spinel ferrite comprising $Ni_{0.5}Zn_{0.3}Co_{0.2}Fe_2O_4$ (NiZnCo) with $B_2O_3$—$Bi_2O_3$—$SiO_2$—ZnO (BBSZ) glass additions.
11. The MD metamaterial of any of items 1-10, wherein the ferrite composition or composite comprises a hexaferrite composite comprising $Ba(CoTi)_{1.2}Fe_{9.6}O_{19}$ M-type hexaferrites and an amount of $Bi_2O_3$, wherein the amount of $Bi_2O_3$ ranges between 1 and 20 wt. %.
12. The MD metamaterial of any of items 1-11, wherein the FSS comprises a low-pass filter, high-pass filter, bandpass filter, or bandstop filter.
13. The MD metamaterial of any of items 1-12, wherein the FSS is operable at a frequency equal to or greater than 0.05 GHz.
14. The MD metamaterial of any of items 1-13, wherein the FSS is operable at a frequency between about 0.05 GHz to about 2 GHz.
15. The MD metamaterial of any of items 1-14, wherein the FSS and MD substrate have a magnetic loss tangent tan $\delta_\mu$ less than 0.40 at 50 MHz or greater bandwidth about a center frequency between about 0.05 to about 2 GHz.
16. The MD metamaterial of any of items 1-15, wherein the FSS and MD substrate have a dielectric loss tangent $\delta_\mu$ less than 0.01 over a frequency of about 0.05 to about 2 GHz.
17. An article comprising the MD metamaterial of any of items 1-16.
18. The article of item 17, wherein the article is a radome, an antenna substrate and/or superstrate, an electromagnetic bandgap (EBG) substrate and/or superstrate, or a coating.

19. The article of any of items 17-18, further comprising a multiferroic component comprising a ferrimagnetic or ferromagnetic component, a ferroelectric component, or a ferroelastic component, or a combination thereof.

20. The article of any of items 17-19, wherein the article is operable at a frequency equal to or greater than 0.05 GHz.

DETAILED DESCRIPTION

Figure 1A:
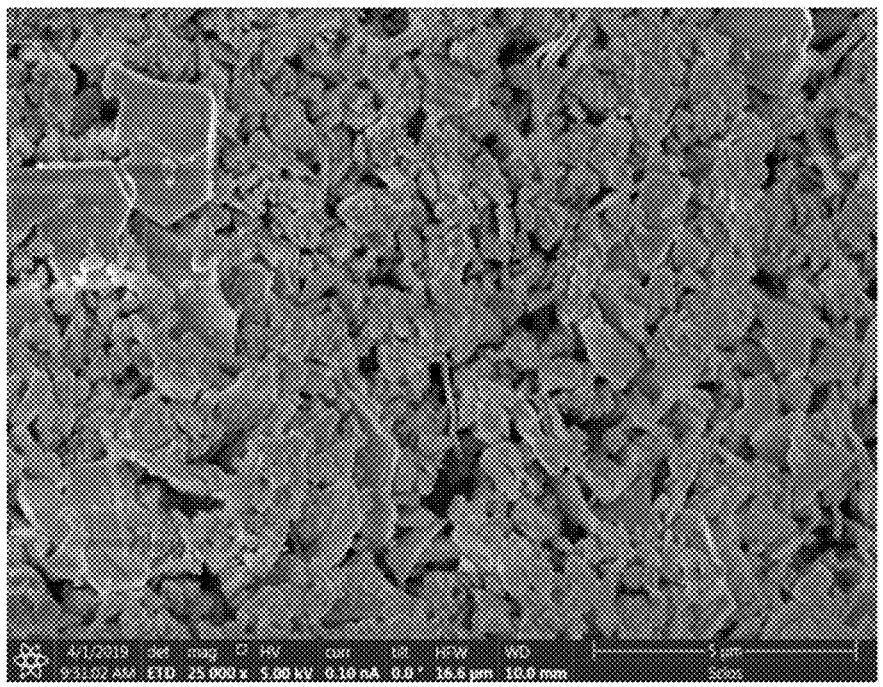
FIG. 1A is an SEM image of pre-sintered powder after 8 hrs of ball milling.

The present technology provides a new class of magnetodielectric (MD) metamaterials for use as smart materials and coatings that provide impedance of free space (i.e., unity) together with concomitant minimal broadband reflection losses (RL) and insertion losses (IL) and with strategic filtering functions and out-of-band rejection. Together, these properties can mitigate extreme electronic warfare (EW) threats as well as co-site interference situations arising from co-location of multiple radar and communication systems on common land, sea, and air platforms. The present technology provides radomes, coatings, and other structures that offer environmental protection as well as transparency to electromagnetic signals.

More particularly, embodiments of a magnetodielectric (MD) metamaterial can be made by integrating compositions and composite materials as described herein with frequency selective bandpass metasurfaces (FSS). In some embodiments, a magnetodielectric (MD) metamaterial comprises a magnetodielectric (MD) substrate comprising a ferrite composition having a characteristic impedance matching an impedance of free space within 5%; and at least one frequency selective surface (FSS) having a plurality of frequency selective surface elements disposed in a pattern and supported on the MD substrate. The FSS can comprise a conducting composition, and can be configured to permit one or more of transmission, reflection, or absorption at a selected resonant frequency or selected frequency band. In some embodiments, the ferrite composition can have a characteristic impedance matching an impedance of free space within 3%. In some embodiments, the ferrite composition or composite material can be a hexaferrite, a spinel ferrite, or a garnet ferrite.

In some embodiments, articles can be provided including MD metamaterials as described herein. In some embodiments, articles can include a radome, an antenna substrate and/or superstrate, or an electromagnetic bandgap (EBG) substrate and/or superstrate. In some embodiments, articles can include a multiferroic component having a ferrimagnetic or ferromagnetic component, a ferroelectric component, or a ferroelastic component, or combinations thereof. In some embodiments, articles can include a composite comprising hexaferrite and ferroelectric components and can form multiferroic heterostructures. These composites can be functionalized by integration with frequency selective surfaces (FSS) that provide band-pass filtering tailored to particular antenna system needs such as operational bands, bandwidths, reflection losses (RL) and insertion losses (IL). Structural properties can be concomitantly engineered to mitigate extreme environmental challenges.

By way of additional explanation, standard radomes offer structural protection against environmental conditions with limited higher functionality. The properties of standard radomes are compared with the properties of radomes using the MD metamaterials and structures of present technology are compared in Table 1.

TABLE 1

| | Features | | | | Drawbacks | | |
|---|---|---|---|---|---|---|---|
| Radome Type | Can withstand >150 MPH winds | Electrically thin broadband performance | Multiband performance | Thermally insulating properties | Requires constant positive pressure | Lossy support frame | Comments |
| Self supporting sandwich | X | — | X | X | — | — | |
| Inflatable | X | X | — | — | X | — | |
| Metal space frame | X | X | X | — | X | X | |
| Dielectric space frame | X | X | X | — | X | X | Negative: Insertion loss ripple above 1 GHz |
| Solid Laminate | X | — | — | X | — | — | Negative: Single band tuning |

TABLE 1-continued

| | Features | | | | Drawbacks | | |
|---|---|---|---|---|---|---|---|
| Radome Type | Can withstand >150 MPH winds | Electrically thin broadband performance | Multiband performance | Thermally insulating properties | Requires constant positive pressure | Lossy support frame | Comments |
| Impedance-engineered magnetoceramic meta-structure (IE-MMS) | X | X | X | X | — | — | Positive: Impedance of unity with passband filtering and out of band rejections |

The physics and materials science approach underlying the present technology is based in the optimization of design and processing protocols for engineering the microstructure, morphology, composition, defect structures, grain-boundary engineering, and crystallographic texture, and their impact upon microwave constitutive relationships.

Hexagonal ferrites, or hexaferrites, are a type of iron-oxide ceramic compound that has a hexagonal crystal structure and exhibits magnetic properties. Several types or families of hexaferrites are known, including Z-type hexaferrites, M-type hexaferrites, W-type hexaferrites, Y-type hexaferrites, X-type hexaferrites, and U-type hexaferrites. Hexaferrites are further described in US Patent Publication No. 2018/0016157 and No. 2017/0213628, the disclosures of which are incorporated by reference herein.

Table 2 provides a listing of types of ferrites, including their formula, heavy transition metal (TM) dopants, light transition metal (TM) dopants, and additives, that can be used in embodiments described herein. In Table 2, S is spinel, a cubic ferrite. The other ferrite types are as noted above. Ferrite composites or composite materials can include one or more additives as shown in the right column of Table 2.

TABLE 2

| Ferrite | Stoichiometry | Heavy TM dopants | Light TM dopants | Additives |
|---|---|---|---|---|
| M | $BaFe_{12}O_{19}$ | Hf, Ir, Mo | Co, Ti | $Ba(CoTi)_{1.2}Fe_{9.6}O_{12}$ M-type hexaferrites |
| W | $BaCo_2Fe_{16}O_{27}$ | | | with various $Bi_2O_3$ contents (5-17 wt. %) |
| U | $Ba_4Co_2Fe_{36}O_{60}$ | | | $B_2O_3$—$Bi_2O_3$—$SiO_2$—ZnO (BBSZ) |
| X | $Ba_2Co_2Fe_{28}O_{46}$ | | | (0-2 wt. %) $Bi_2O_3$ |
| Y | $Ba_2Co_2Fe_{12}O_{22}$ | | | (5-8 wt. %) $B_2O_3$ |
| Z | $Ba_3Co_2Fe_{24}O_{41}$ | | | $BiFeO_3$ |
| S | $(NiCo)Fe_2O_4$ | | | $BiFeO_4$ |
| | | | | $BaTiO_3$ |

In some embodiments, advanced magnetodielectric materials can be provided to enable high permeability and permittivity with low magnetic losses with broadband performance. Using magnetodielectric materials, with properties such as equivalency of $\varepsilon'$ and $\mu'$, allows for the design of miniaturized frequency agile components for modern communication systems such as radomes, antenna substrates and superstrates, and electromagnetic band-gap (EBG) substrates and superstrates. Additionally, $\varepsilon'=\mu'$ enables impedance matching to free space, an important parameter for antennas to operate without additional impedance matching circuitry as well as allowing for efficient power transfer and band-pass operation.

In some embodiments, the composite may achieve low magnetic and dielectric losses as well as equivalent permittivity and permeability over a frequency range of 0.05 to 4 GHz. Fine process control can be conducted to ensure optimal magnetic properties by varying process parameters influencing grain size and implementing organic dispersants (isobutylene and maleic anhydride) for achieving maximum densities.

In some embodiments, ferrite composites of nominal composition $Ba_3Co_{2+x}Fe_{24-2x}O_{41}$, where x=0-0.05, of quadrivalent Ir, Hf, and/or Mo, can be provided. Crystallographic structure, characterized by X-ray diffraction (described further below), reveals that doping with $Ir^{4+}$, $He^{4+}$, or $Mo^{4+}$ does not adversely affect the crystal structure phase purity of the Z-type hexaferrite. In some embodiments, as shown by measured microwave and magnetic properties, the resonant frequency shifts depending on the specific dopant allows for tunability of the operational frequency. In some embodiments, a frequency band in which permittivity and permeability (~400 MHz) are equal occurs at frequencies between 0.2 and 1 GHz depending on the dopant. In some embodiments, the hexaferrite may have low losses, i.e., tan $\delta_\varepsilon/\varepsilon'=0.0006$ and tan $\delta_\mu/\mu'=0.038$ at 0.70 GHz, with considerable size reduction of an order of magnitude, while maintaining the characteristic impedance of free space (i.e., 377Ω). In some embodiments, miniaturization and band-pass performance of magnetodielectric materials is suitable for communication devices such as antenna and radomes that can be engineered to operate over desired frequency ranges using cost effective and volumetric processing methodologies.

In some embodiments, Z-type barium hexaferrites can be provided in which dopants of quadrivalent heavy transition metal ions, i.e., $Mo^{4+}$, $Ir^{4+}$, and $Hf^{4+}$, can be employed to modify structure and microwave properties. Each dopant can affect the hexaferrites' properties differently by both shifting of the resonant frequency and altering magnetic properties without strongly affecting the hexaferrite crystallographic structure. Additionally, $\varepsilon'=\mu'$ was realized without any additives such as $Bi_2O_2$, which had been previously been used for tuning permeability and permittivity in hexaferrite systems. This can allow for a cost effective approach and ease of manufacturing of hexaferrite materials for highly multifunctional and miniaturized RF devices and systems.

In some embodiments, polycrystalline $Co_2Z$ hexaferrites can be provided, having a nominal composition of $Ba_3Co_{2+x}Fe_{24-2x}O_{41}$ substituted with quadravalent $Ir_X$, $Hf_X$, $Mo_X$, where x=0.0 to 0.05. In some embodiments, the hexaferrites can be prepared by solid state processes. In some embodiments, particle sizes after sintering can be around 1-2 microns, which is consistent with single magnetic domain particles. In some embodiments, a small amount (<3%) of a secondary Y-type phase may be present in the Z-type composition. However, the magnetic properties and frequency bands of operational interest were markedly different. Thus, the impedance of $Co_2Z$ ferrites can be tuned using quadrivalent heavy transition metals as substitutional cations to that of free space, i.e., 377Ω, at frequencies in the UHF band, while maintaining low losses and considerable reduction in size. As a result, antenna, electromagnetic bandgap (EBG) substrates, and radomes, among other applications, can be developed for different applications in the UHF where unique rf scattering behavior and miniature form factors are desirable.

In some embodiments, a hexaferrite composition may comprise an oxide structure having iron, cobalt, and one or more of barium, strontium, iridium, hafnium, and molybdenum having a composition comprising $Ba_3Co_{2+x}Fe_{24-2x}O_{41}$, where x=0.05 to 0.20 of quadrivalent iridium, hafnium, and molybdenum.

In some embodiments, a hexaferrite composition may be $Ba(CoTi)_{1.2}Fe_{9.6}O_{19}$ and an amount of $Bi_2O_3$, the amount $Bi_2O_3$ ranging between 0 and 8 wt %.

In some embodiments, a hexaferrite composition may be Co2Z and Co2Y ferrite particles, having nominal compositions $Ba_3Co_2Fe_{24}O_{41}$ and $Ba_2Co_2Fe_{12}O_{22}$, respectively.

In some embodiments, a hexaferrite composite may be $Ni_{0.5}Zn_{0.3}Co_{0.2}Fe_2O_4$ (NiZnCo) with $B_2O_3$—$Bi_2O_3$—$SiO_2$—ZnO (BBSZ) glass additions.

In some embodiments, a hexaferrite composite may be $Ba(CoTi)_{1.2}Fe_{9.6}O_{19}$ M-type hexaferrites and an amount of $Bi_2O_3$, wherein the amount of $Bi_2O_3$ ranges between 5 and 17 wt. %.

Figure 5A:
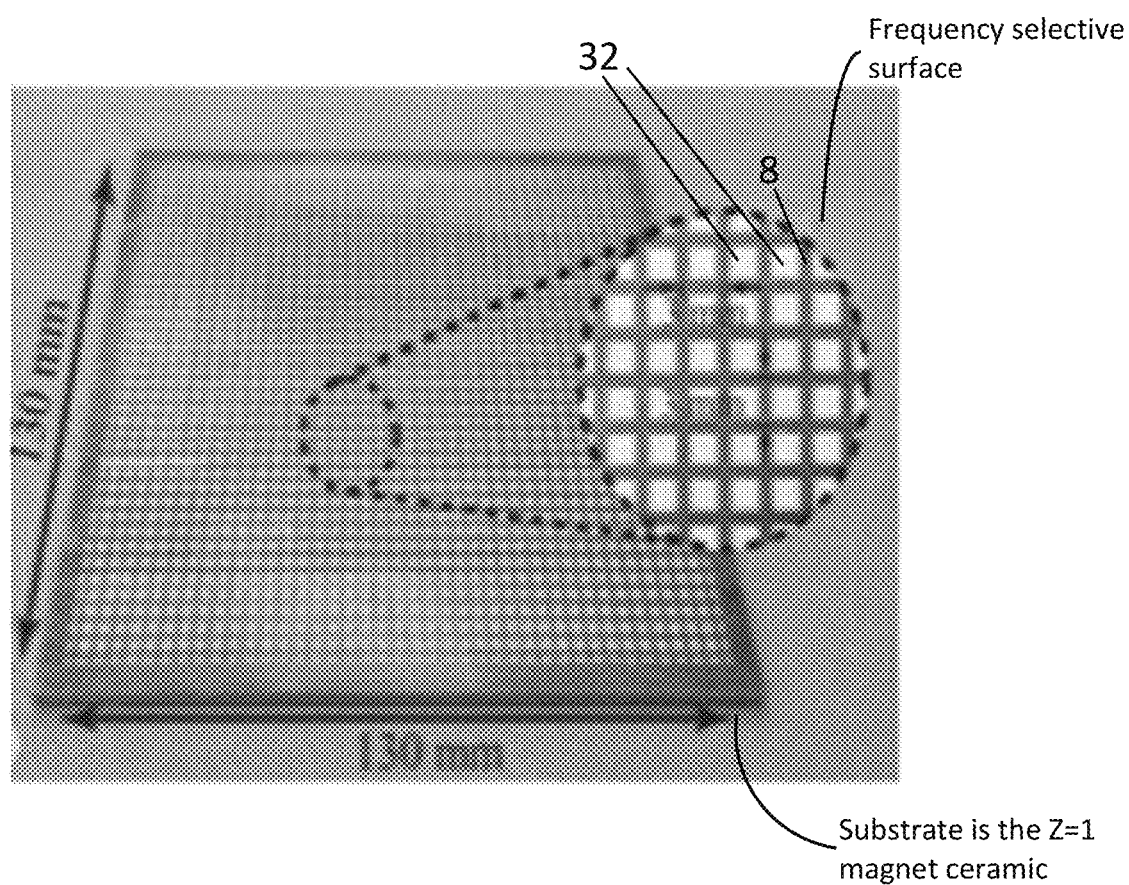
FIG. 5A is a photograph of an FSS with stencil for a capacitive patch array.
Figure 5B:
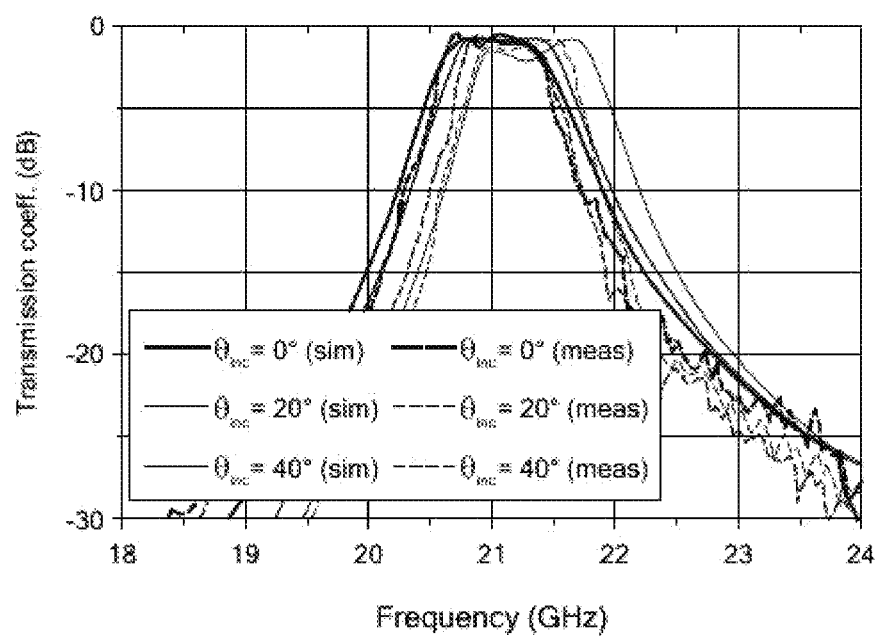
FIG. 5B is a graph of simulated and measured band pass behavior of the FSS capacitive patch array of FIG. 5A at 21 GHz with a bandwidth of ~1 GHz having IL~2 dB and out-of-band rejection exceeding 20 dB.

As noted above, embodiments of a magnetodielectric (MD) metamaterial can be made by integrating hexaferrite compositions as described herein with frequency selective bandpass metasurfaces (FSS). When an FSS is exposed to EM waves, electric currents are excited in the unit cell elements of the FSS. This current acts as an EM source and produces a scattered field. The scattered field, along with incident fields, constitutes the total fields in the space around the FSS. As a result, the required filter response can be generated based on the design elements. The frequency behavior of the FSS can be determined by the distribution of the current upon the shape of the elements. FIG. 5A presents a photograph of an embodiment of an FSS with a stencil (8) for providing a capacitive patch array. The stencil includes a plurality of unit cells (32). FIG. 5B illustrates simulated and measured band pass behavior at 21 GHz with a bandwidth of ~1 GHz having IL~2 dB and out-of-band rejection exceeding 20 dB. FIG. 5B is illustrative of the functionality of the FSS which, by altering the unit cell dimensions, shifts the center frequency and bandwidth in frequency space to coincide to the properties of the MD.

Figure 6:
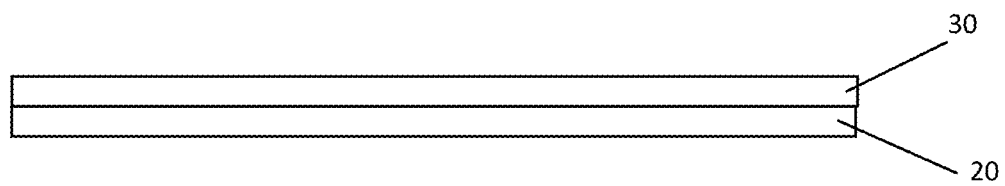
FIG. 6 is a schematic side view of a magnetodielectric (MD) metamaterial.

The FSS elements can have any desired configuration or geometry, depending on the application, such as straight lines, multi-lines, crossed lines, center-connected lines or N-poles, loops, slots, patches, convoluted lines, meandered lines, interwoven lines, fractals, and the like. The FSS elements can be fabricated in any suitable manner, such as using lithographic techniques or 3D printing techniques. FIG. 5A illustrates a stencil for providing FSS elements a patch array. FIG. 6 illustrates a schematic side view of a magnetodielectric (MD) metamaterial having a magnetodielectric (MD) substrate 20 and a frequency selective surface (FSS) 30 supported on the MD substrate.

Example

Polycrystalline $Co_2Z$ hexaferrites, having a nominal composition of $Ba_3Co_{2+x}Fe_{24-2x}O_{41}$ with the additions of $Ir_{(x)}$, $Hf_{(x)}$, $Mo_{(x)}$, where x=0 to 0.05, were prepared by solid state reaction. $BaCo_3$, $IrO_2$, $HfO_2$, MoO2, Co3O4, and $Fe_2O_3$ of high purity (i.e., ≥99.95%) (Sigma-Aldrich) were mixed and calcined in flowing oxygen gas at a rate of 1 SCFH for 5-8 hours at 900-1000° C. The calcined mixtures were then ball milled for 18-24 hours to a particle size ranging from 1-2 μm. Achieving a particle size of 1-2 μm provides for the stabilization of a single-magnetic domain within the particle that allows for low magnetic coercivity. The grain size was measured by scanning electron microscopy (FESEM, FEI Scios Dual-Beam). Furthermore, isobutylene and maleic anhydride (Kuraray ISOBAM 104) with 70 to 80% hexaferrite solid loading were combined with deionized water to form a slurry that was mixed at 2500 rpm for several minutes. The addition of ISOBAM allowed for the samples to reach a maximum density close to the theoretical value of 5.37 g cm. Samples were then pressed to form toroids having an inner diameter of 3 mm and an outer diameter of 7 mm. This sample size was adequate for the use of a transmission air-line microwave measurements (Maury Microwave No. 2650CK). The toroids were then additionally compacted at a pressure of 350 lbs/in$^2$ under cold isostatic conditions to maximize density prior to sintering. Sintering was performed for 4-6 hours at 1000-1250° C. in an oxygen gas environment; conditions that have been demonstrated to reduce magnetic and dielectric losses.

Crystallographic structure was determined using a θ-2θ powder X-ray diffractometer (Rigaku, Ultima III) at room temperature employing Cu kα radiation (λ=1.5406 Å). The complex permittivity and permeability spectra were measured over a frequency range from 0.2 to 4 GHz using an Agilent E864A 45 MHz-50 GHz PNA series network analyzer and a 7 mm HP 85050C precision airline. In this Letter, we present and discuss measured values of relative permeability and relative permittivity for these novel materials.

Figure 1B:
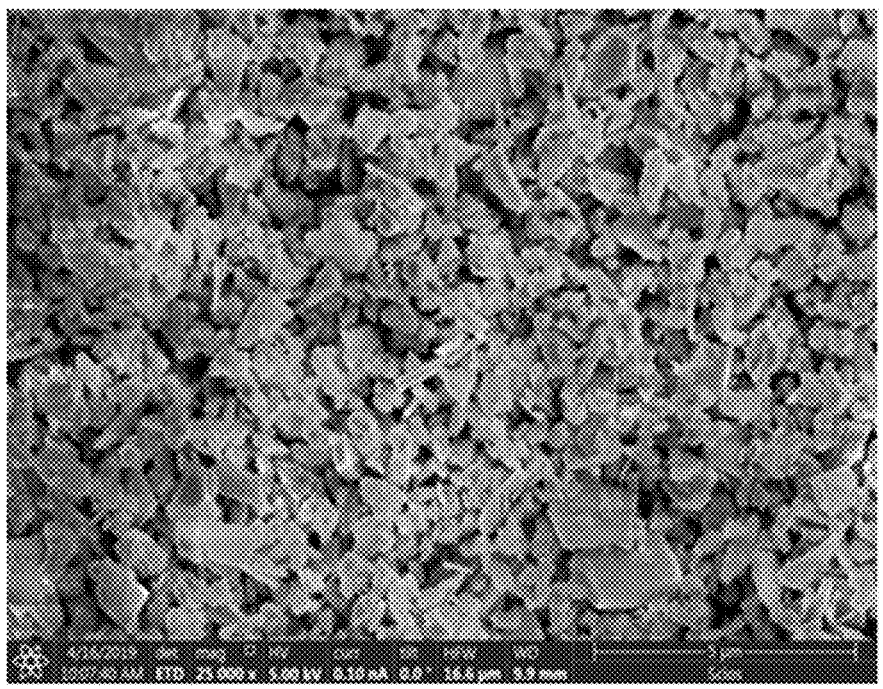
FIG. 1B is an SEM image of a toroid sample created after a 24 hour ball milling cycle and then sintered.
Figure 1C:
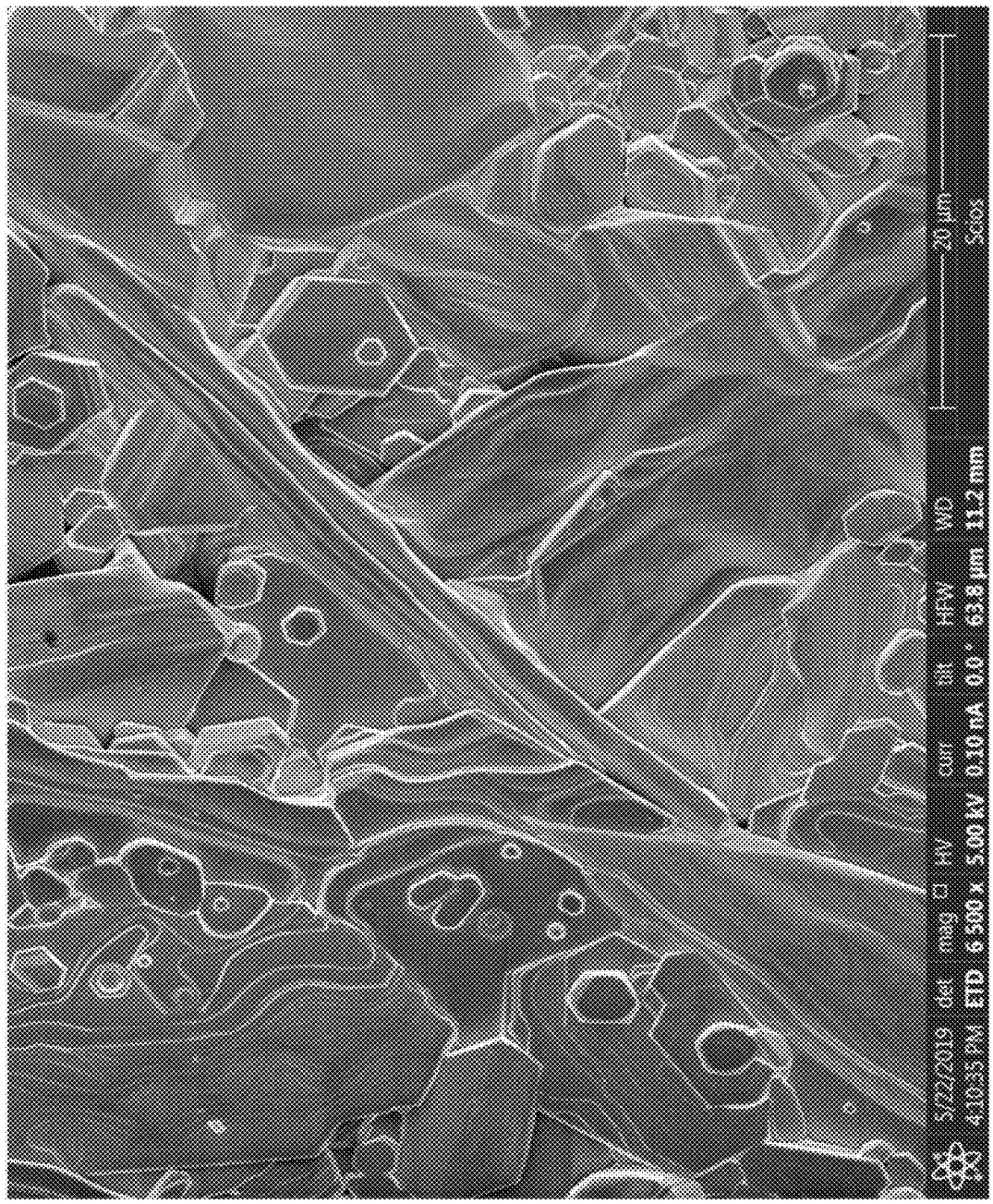
FIG. 1C is an SEM image of a final toroid sample with hexaferrite crystals of a diameter of approximately 3 μm.

In order to optimize r.f. and d.c. properties, i.e., magnetization, low losses, and high permittivity and permeability, the grain size of the ferrite samples together with their density, were optimized by varying process conditions such as milling and sintering protocols. Scanning electron microscopy was employed to analyze the samples. It can be seen from FIG. 1A that the grain size after 8 hrs. of ball milling, prior to sintering, was ~5 μm, however there exists some grains that are larger. In order to reduce this bimodal grain size distribution, an additional 24-hour ball milling step was employed. FIG. 1B illustrates the final grain size that resulted from the 24-hour ball milling step prior to sintering. Control of grain size distribution allows for the optimization of magnetic properties for the substituted $Co_2Z$ hexaferrites. This is seen in FIG. 1C, which shows the hexaferrite particle size to be ~3 μm after sintering.

Figure 2:
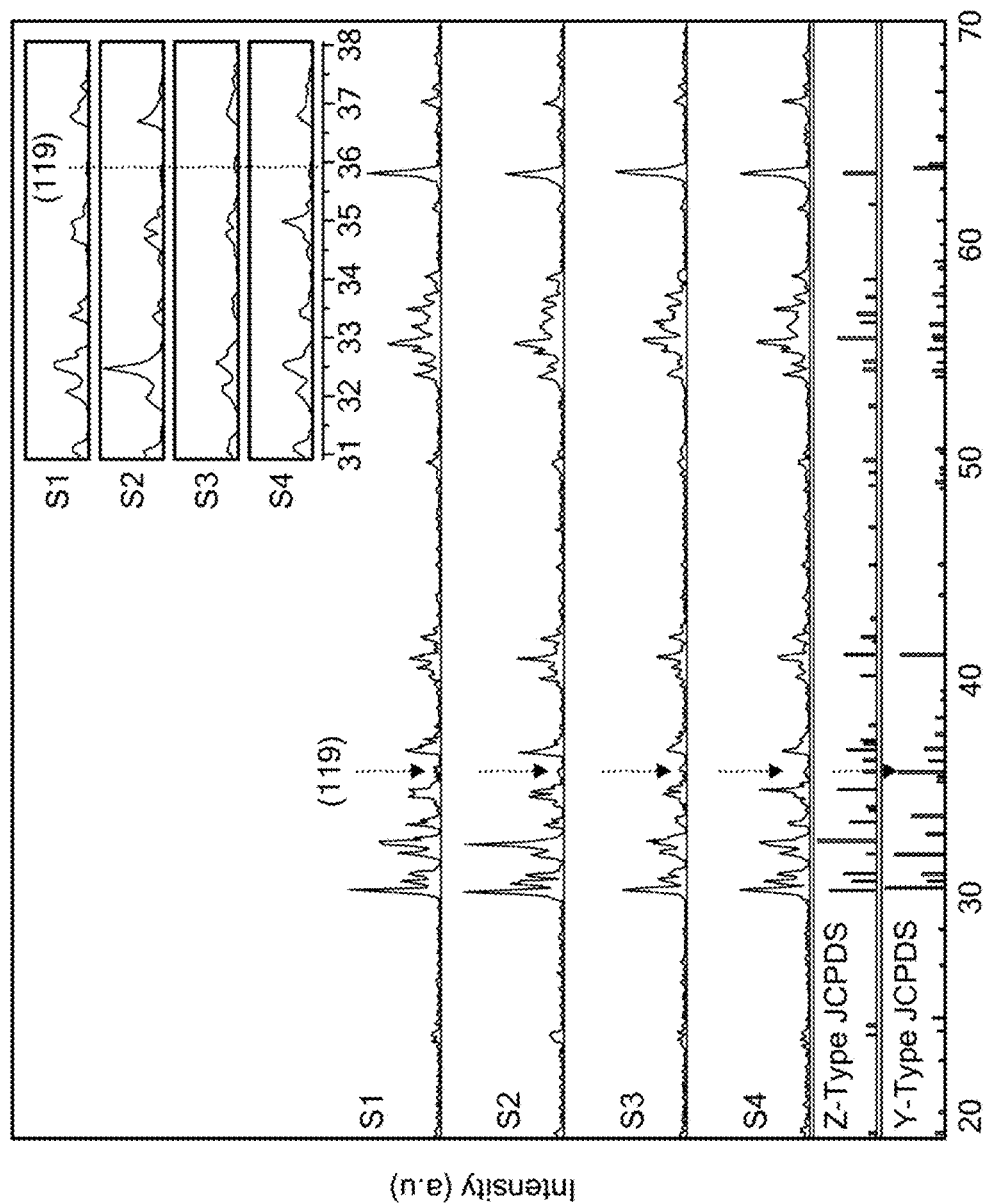
FIG. 2 illustrates X-ray diffraction patterns of ferrite samples (S1: $Ba_3Co_2Fe_{24}O_{41}$, S2: $Ba_3Co_{2.05}Hf_{0.05}Fe_{23.90}O_{41}$, S3: $Ba_3Co_{2.05}Mo_{0.05}Fe_{23.90}O_{41}$, S4: $Ba_3Co_{2.05}Ir_{0.05}Fe_{23.90}O_{41}$). Additionally, standard diffraction information extracted from relevant JCPDS data cards corresponding to Z-type and Y-type hexaferrite features are included. Data were collected at room temperature in a θ-2θ geometry using a Cu kα radiation source. The inset figure is an expanded view of the 2θ range of 31-38 degrees. In this inset one sees the intensity of the (119) Y-type peak whose intensity is very low supporting the interpretation that this is a nearly pure Z-type phase.

X-ray diffraction (XRD) was performed in order to characterize the crystal structure of all hexaferrite samples of the present study. Experimental XRD patterns, with similar data presented as diffraction lines of intensity and 2θ placement extracted from the JCPDS data file corresponding to Z-type and Y-type hexaferrite phases are also shown in FIG. 2. All of the diffraction features are indexed to either Z-type or Y-type hexaferrite crystallographic phases. Note, the Y-type diffraction features are marked by the solid circle symbols in FIG. 2. Z-type hexaferrite materials prepared by solid state reaction often contain a small volume of a secondary phase of W- and/or Y-type phases[10]. However, in FIG. 2 nearly all reflections of the Y-type and Z-type phase overlap making it difficult to ascertain the presence and volume fraction of the Y-type hexaferrite phase. The exception is the (119) peak having a relative intensity in the Y-type XRD spectrum of 74% (JCPDS PDF #44-0206) appearing at 2θ~36°. The presence of this peak in all samples does not rise above 1-3% intensity indicating that the samples under study are nearly pure Z-type hexaferrites.

Generally, in materials heat-treated at temperatures ranging between 1200-1300° C., the Z-type phase is most prominent and hence similar heat treatment conditions have been employed here. It is seen in FIG. 2, that the parent composition, which does not include any dopants, and the compositions that do include dopants of Ir, Hf, or Mo do not demonstrate measurable change to the crystallographic phase purity. Intensities of the Z-type peak slightly changes from the parent composition (i.e., x=0) to those containing dopants; however, the amounts of Y-type phase remains nearly the same and of little consequence to structure or rf properties. This clearly shows that doping with Ir, Hf, or Mo at similar concentrations does not significantly change the crystal structure from a quasi-single phase.

In order to investigate the affect upon microwave properties of substituted Z-type hexaferrites, the complex permittivity and permeability spectra were measured over a frequency range from 0.2 to 4 GHz using an Agilent E864A 45 MHz-50 GHz PNA series network analyzer and a 7 mm HP 85050C precision airline.

Figures 3A, 3B:
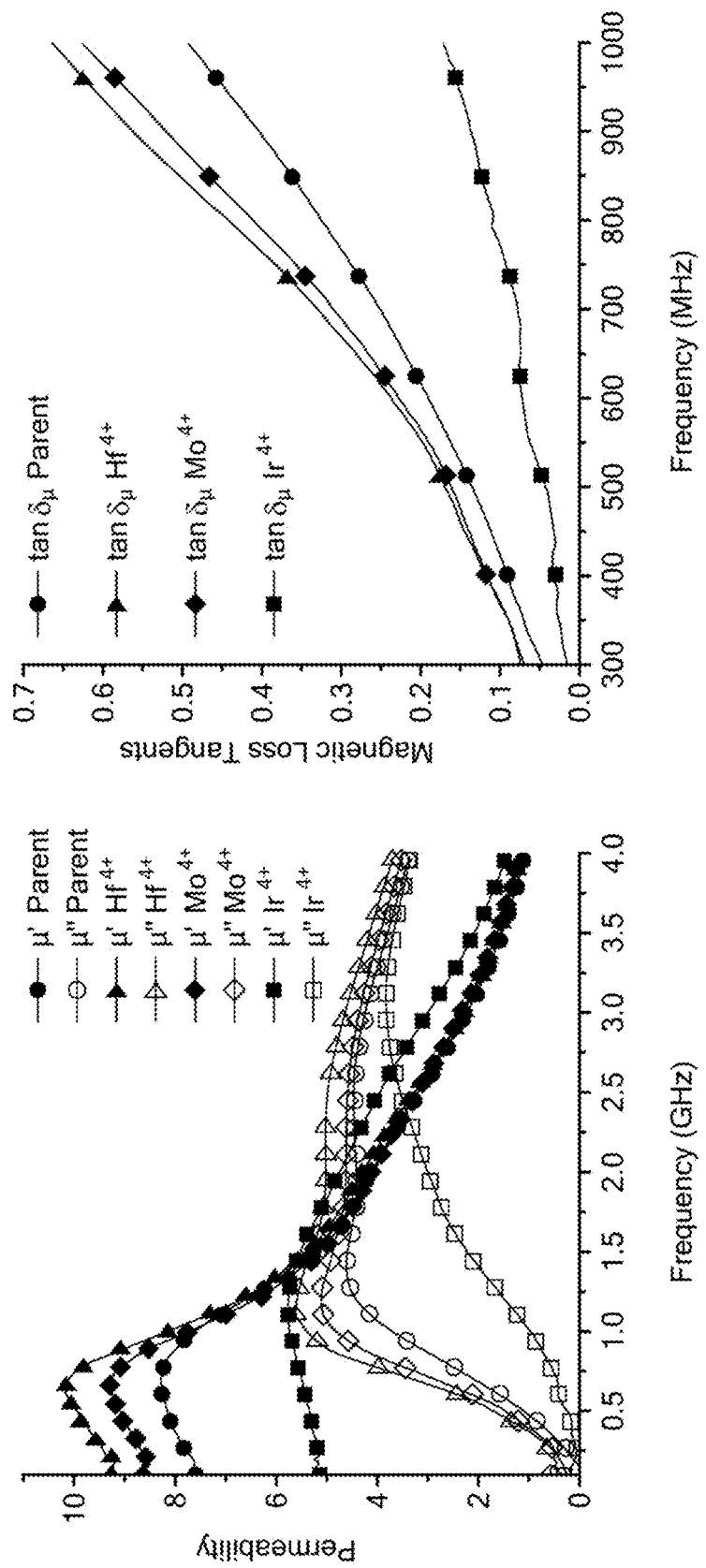
FIG. 3A is a graph of complex permeability ($\mu'$ and $\mu''$).
FIG. 3B is a graph of magnetic loss tangents of the parent and doped $Ba_3Co_{2+x}Fe_{24-2x}O_{41}$ samples. One sees that the operational band is near 0.20 to 0.80 GHz.

As displayed in FIG. 3A, the permeability changes substantially with the addition of various dopants. From FIG. 3A, it can be seen that upon substitution of $Ir^{4+}$ ions to the parent composition the maximum value of μ' shifts to higher frequencies resulting in a lower permeability of ~6 at 1.25 GHz. However, when $Hf^{4+}$ is added to the parent composition the maximum value of μ' shifts to lower frequencies resulting in a higher permeability ~10 at 0.70 GHz. Results of adding $Mo^{4+}$ ions have the maximum value of μ' shifting in between that of the other phases with dopants of $Ir^{4+}$ and $Hf^{4+}$ with permeability and resonant frequencies falling in the middle of the spectra corresponding to the different dopants. Additionally, as permeability decreases the magnetic loss tangent decreases as seen in the case of $Ir^{4+}$ shown in FIG. 3 (b). This behavior corresponds to the quadrivalent heavy transition metal cations on both frequency and permeability allows the customization of the ferrite for specific applications with low loss requirements. The effect of the dopants can be attributed in part to the ionic radii of the dopants and the corresponding distortion to the crystal lattice and its influence upon the magnetocrystalline anisotropy energy and fields. Changes to anisotropy play a major role in the gyromagnetic properties of ferrites in determining conditions and performance of operation.

Figure 4B:
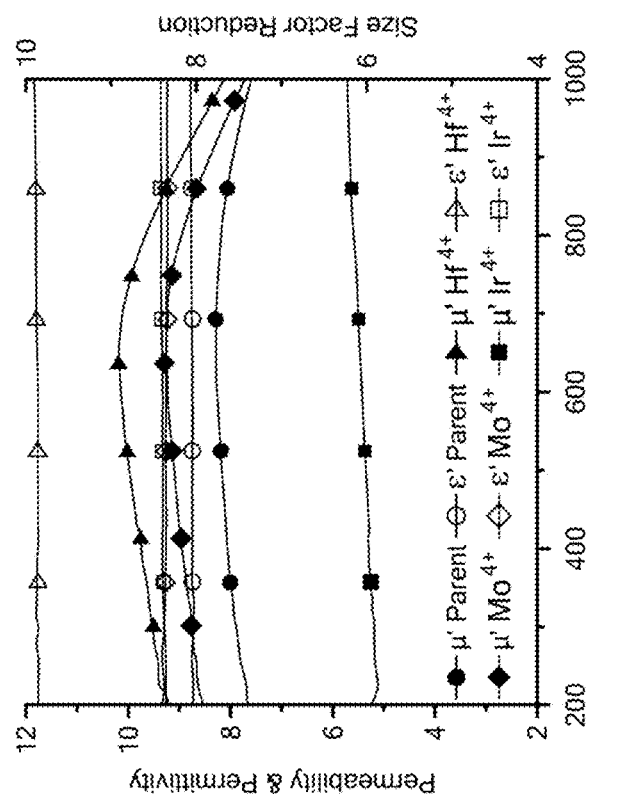
FIG. 4B is a graph of permeability and permittivity ($\mu'$ and $\varepsilon'$) as a function of frequency. The impedance of free space is 377Ω and size factor reduction increases with increasing ($\mu'$ and $\varepsilon'$).
Figure 4A:
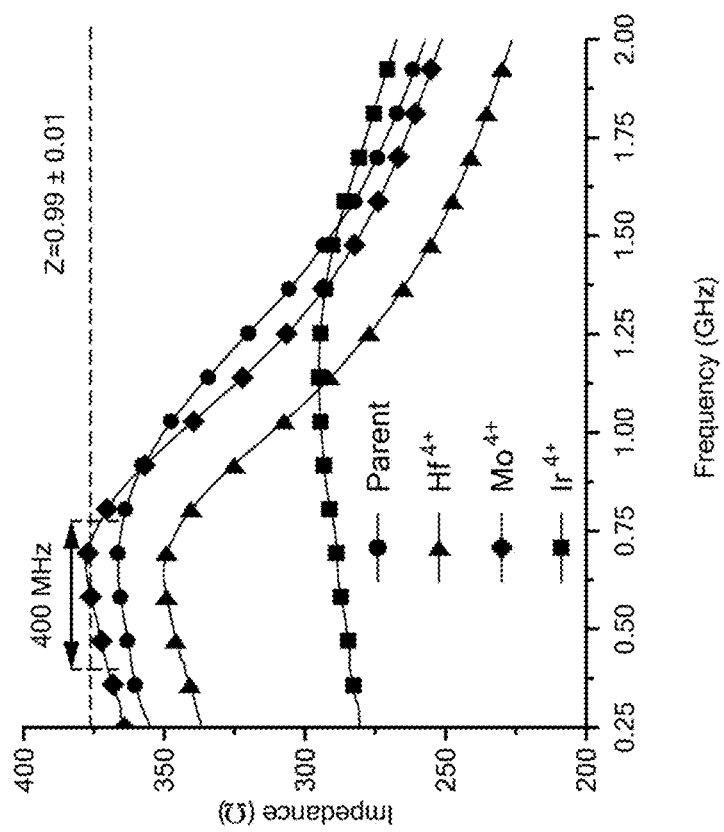
FIG. 4A is a graph of impedance as a function of frequency.

To further investigate the properties and application value of these ferrites, especially in applications such as antennas, it is critical to understand the impedance and form factor. The impedance and form factor equations can be expressed as Eqns. (1) and (2):

$$\eta = \sqrt{\frac{\mu_o \mu_r}{\varepsilon_o \varepsilon_r}} \quad (1)$$

$$\sqrt{\varepsilon'_r \mu'_r} \quad (2)$$

where $\mu_o$, $\varepsilon_o$, $\mu_r$, and $\varepsilon_r$ are the permittivity and permeability in vacuum and of the ferrite, respectively. By applying Eqns. (1) and (2), the impedance of each doped ferrite sample was determined as presented in FIG. 4A. The $Mo^{4+}$ doped composition maintained the largest bandwidth of ~400 MHz in impedance matching to free space, i.e., 377Ω. A size factor reduction of roughly 8.5 was achieved in the impedance matching band as shown in FIG. 4B. This occurred at a center frequency of 0.70 GHz with a minimum in dielectric and magnetic loss of tan $\delta_\varepsilon/\varepsilon'$=0.0006 and tan $\delta_\mu/\mu'$=0.038, respectively. This particular material could be used for miniaturized antenna designs intended for operation at UHF frequencies.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments and aspects described herein can be combined in a variety of ways. For example, a feature described in conjunction with one embodiment or aspect may be included in another embodiment or aspect even if not explicitly described in conjunction with that embodiment or aspect.

To the extent that the appended claims have been drafted without multiple dependencies, this has been done only to accommodate formal requirements in jurisdictions that do not allow such multiple dependencies. It should be noted that all possible combinations of features that would be implied by rendering the claims multiply dependent are explicitly envisaged and should be considered part of the invention.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

REFERENCES

Z. Zheng, Q. Feng, Q. Xiang, Z. Di, and V. G. Harris, J. Appl. Phys. 121, 063901 (2017)

H. Mosallaei and K. Sarabandi, IEEE Trans. Antennas Propag. 52, 1558 (2004).

Divakaran, S K, Krishna, D D, Nasimuddin, Int J R F Microw Comput Aided Eng. (2019).

D. M. Pozar, Microwave Engineering (John Wiley and Sons, Hoboken, 1989), pp. 92-98.

Z. Su, H. Chang, X. Wang, A. Sokolov, B. Hu, Y. Chen, and V. G. Harris, Appl. Phys. Lett. 105, 062402 (2014).

Y. Chen, A. Daigle, T. Fitchorov, H. Bolin, M. Geiler, A. Geiler, C. Vittoria, and V. G. Harris, Appl. Phys. Lett. 98, 202502 (2011)

A. Kumar, A. Kumar, S. Saha, H. Basumatary and R. Ranjan, Appl. Phys. Lett, 114, 022902 (2019).

K. Iida, Y. Minachi, K. Masuzawa, M. Kawakami, H. Nishio, H. Taguchi, J. Magn. Soc. Japan, 23, 1093-1096 (1999)

R. C. Pullar, Prog. Mater. Sci. 57, 1191 (2012).

Z. Su, Q. Li, X. Wang, B. Hu, Z. Feng, Y. Chen, and V. G. Harris, J. Appl. Phys. 117, 17E506 (2015)

A. P. Daigle, A. L. Geiler, E. DuPrel, Y. Chen, P. V. Parimi, C. Vittoria, and V. G. Harris, IEEE Magn. Lett. 2, 0500104 (2011).

Z. Su, H. Chang, X. Wang, et al., "Low loss factor Co2Z ferrite composites with equivalent permeability and permittivity for ultra-high frequency applications," Appl. Phys. Lett., 105, 062402 (2014); doi: 10.1063/1.4892889

Y Peng, X Wu, Z Chen, W Liu, F Wang, X Wang, Z Feng, Y Chen, "*BiFeO3 tailored low loss M-type hexaferrite composites having equivalent permeability and permittivity for very high frequency applications,*" Journal of Alloys and Compounds, 630, 48-53 (2015).

X Wang, Q Li, Z Su, W Gong, R Gong, Y Chen, V G Harris, "*Enhanced microwave absorption of multiferroic Co 2 Z hexaferrite—BaTiO 3 composites with tunable impedance matching,*" Journal of Alloys and Compounds 643, 111-115, 2015

Zheng, Zongliang; Feng, Quanyuan; Xiang, Qianyin; Di, Zhixiong; Harris, Vincent G; Low-loss NiZnCo ferrite processed at low sintering temperature with matching permeability and permittivity for miniaturization of VHF-UHF antennas Journal of Applied Physics 121 6 63901 2017

Z Su, Q Li, X Wang, B Hu, Z Feng, Y Chen, V G Harris, "*Tunable permittivity and permeability of low loss Z+ Y-type ferrite composites for ultra-high frequency applications,*" Journal of Applied Physics 117 (17), 17E506, 2015.

B. A. Munk, Frequency Selective Surfaces: Theory and Design, Wiley, New York, 2000.

Y. Chen and V. Harris, "Mo-doped CO$_2$Z-Type Ferrite Composite Material for Use UltraHigh Frequency," US Patent Application No. 2018/0016157;

What is claimed is:

1. A radome comprising a magnetodielectric (MD) metamaterial, the MD metamaterial comprising:
   a magnetodielectric (MD) substrate comprising a ferrite composition or ferrite composite, wherein the ferrite composition or ferrite composite has a characteristic impedance matching an impedance of free space within 5% and has a real permittivity equal to its real permeability within 10%; and
   at least one frequency selective surface (FSS) supported on the MD substrate, the FSS comprising a conducting composition having a plurality of unit cell FSS elements selected to permit one or more of transmission, reflection, or absorption at a first resonant frequency band of the FSS that coincides with a second resonant frequency band of the MD substrate,
   wherein the MD metamaterial of the radome has a magnetic loss tangent tan $\delta_\mu$ less than 0.40 at 50 MHz or greater bandwidth about a center frequency between 0.05 to 2 GHz, the center frequency being within one of the first and second frequency bands.

2. The radome of claim 1, wherein the at least one FSS element is selected from the group consisting of loop, center-connected, N-pole, solid interior, and plate, and combinations thereof.

3. The radome of claim 1, wherein the ferrite composition or composite is a hexaferrite composition selected from the group consisting of a Z-type phase hexaferrite, a Y-type phase hexaferrite, an M-type phase hexaferrite, a W-type hexaferrite, an X-type hexaferrite, and a U-type hexaferrite, and combinations thereof.

4. The radome of claim 1, wherein the ferrite composition or composite is a spinel ferrite of stoichiometry (TM)Fe$_2$O$_4$, where TM is a transition metal selected from the group consisting of iron, cobalt, manganese, nickel, zinc, copper, magnesium, chromium, and titanium of valence +1, +2, +3, or +4, and combinations thereof.

5. The radome of claim 1, wherein the ferrite composition or composite comprises a hexaferrite composition comprising a Z-type hexaferrite phase, a Y-type hexaferrite phase, or both a Z-type hexaferrite phase and a Y-type hexaferrite phase.

6. The radome of claim 1, wherein the ferrite composition or composite comprises a hexaferrite composition comprising an oxide structure having iron, cobalt, zinc, nickel, chromium, manganese, magnesium, and/or titanium and one or more of barium, strontium, iridium, hafnium, and molybdenum having a composition comprising Ba$_3$Co$_{2+x}$Fe$_{24-2x}$O$_{41}$, where x=0.05 to 0.20 of quadrivalent iridium, hafnium, and molybdenum.

7. The radome of claim 1, wherein the ferrite composition or composite comprises Ba(CoTi)$_{1.2}$Fe$_{9.6}$O$_{19}$ and an amount of Bi$_2$O$_3$, the amount Bi$_2$O$_3$ ranging between 0 and 10 wt %.

8. The radome of claim 1, wherein the ferrite composition or composite comprises a hexaferrite composition comprising Co2Z and Co2Y ferrite particles, having nominal compositions Ba$_3$Co$_2$Fe$_{24}$O$_{41}$ and Ba$_2$Co$_2$Fe$_{12}$O$_{22}$, respectively.

9. The radome of claim 1, wherein the ferrite composition or composite comprises a spinel ferrite comprising Ni$_{0.5}$Zn$_{0.3}$Co$_{0.2}$Fe$_2$O$_4$ (NiZnCo) with B$_2$O$_3$—Bi$_2$O$_3$—SiO$_2$—ZnO (BBSZ) glass additions.

10. The radome of claim 1, wherein the ferrite composition or composite comprises a hexaferrite composite comprising Ba(CoTi)$_{1.2}$Fe$_{9.6}$O$_{19}$ M-type hexaferrites and an amount of Bi$_2$O$_3$, wherein the amount of Bi$_2$O$_3$ ranges between 1 and 20 wt. %.

11. The radome of claim 1, wherein the FSS comprises a low-pass filter, high-pass filter, bandpass filter, or bandstop filter.

12. The radome of claim 1, wherein the FSS is operable at a frequency equal to or greater than 0.05 GHz.

13. The radome of claim 1, wherein the FSS is operable at a frequency from 0.05 GHz to 2 GHz.

14. The radome of claim 1, wherein the FSS and MD substrate have a dielectric loss tangent tan $\delta_\epsilon$ less than 0.01 over a frequency of 0.05 to 2 GHz.

15. The radome of claim 1, further comprising a multiferroic component comprising a ferrimagnetic or ferromagnetic component, a ferroelectric component, or a ferroelastic component, or a combination thereof.

16. The radome of claim 1, wherein the radome is operable at a frequency equal to or greater than 0.05 GHz.

* * * * *